Patented Jan. 18, 1944

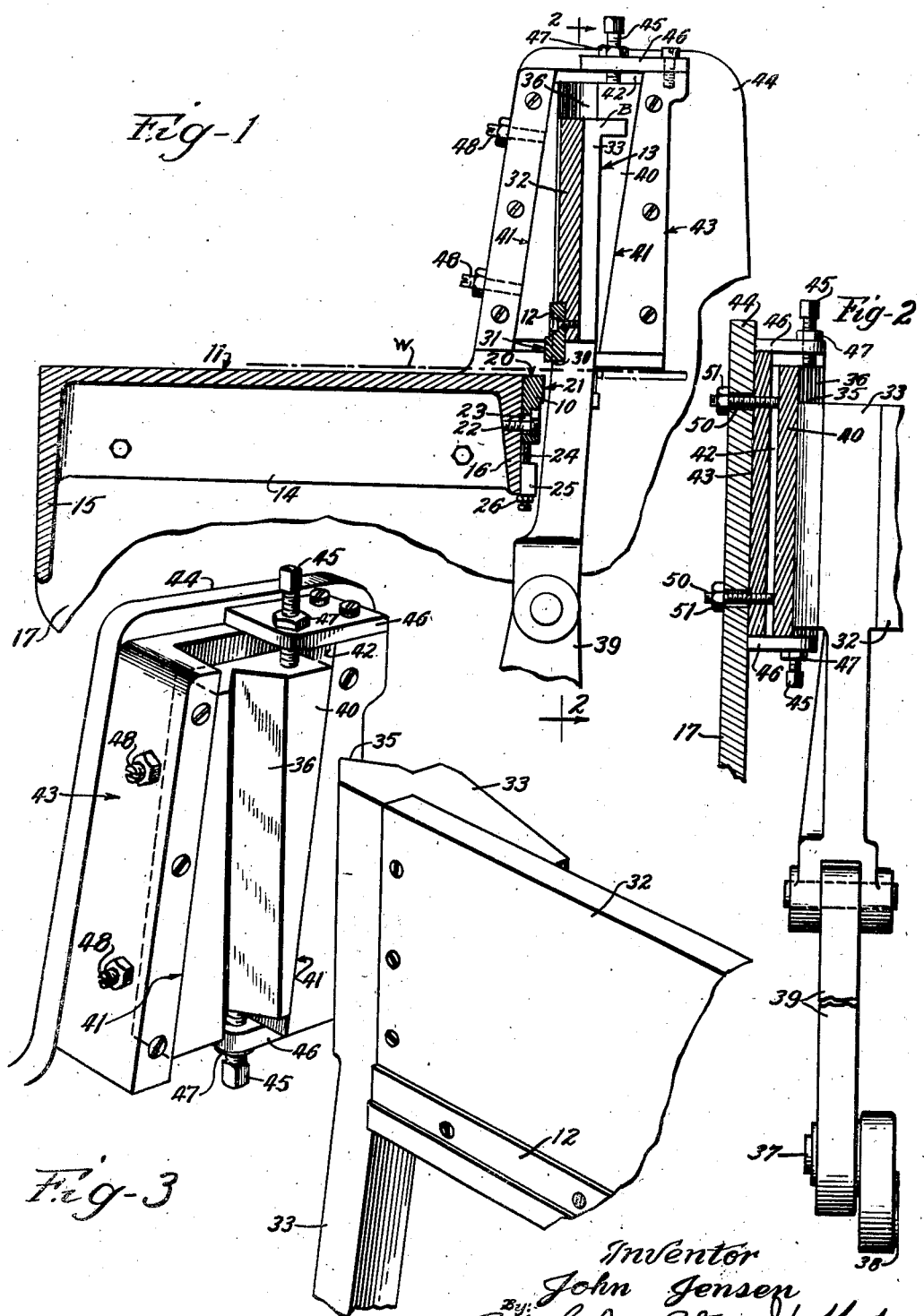

2,339,641

UNITED STATES PATENT OFFICE 2,339,641

SQUARING SHEARS

John Jensen, Rockford, Ill., assignor to Whitney Metal Tool Company, Rockford, Ill., a corporation of Illinois Application April 20, 1942, Serial No. 439,633

9 Claims. (Cl. 164—47)

The invention relates to apparatus for shearing metal sheets or the like and more particularly to improvements in squaring shears.

The primary object of the invention is to provide improved blade adjusting means for shears of the above general character whereby the relative positions of the cutting edges of blades of any given thickness may be quickly and accurately adjusted for proper coaction.

Another object is to provide improved guide means for the movable blade carrier which guide means is readily adjustable to accommodate shear blades of different thicknesses without changing the normal direction of movement of the carrier with respect to the stationary shear blade.

A further object is to provide improved guide means for the movable blade carrier which is readily adjustable to take up wear and which can be replaced when necessary with a minimum of effort and expense.

Other objects and advantages of the invention will become apparent from the following detailed description of the preferred embodiment illustrated in the accompanying drawing, in which:

Figure 1 is a transverse vertical sectional view of a squaring shears embodying the features of the invention.

Fig. 2 is a fragmentary sectional view taken along the line 2—2 of Fig. 1 showing details of the improved blade carrier guiding means.

Fig. 3 is a fragmentary perspective view showing one end of the blade carrier and the associated guiding means therefor.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring now to the drawing, the squaring shear selected to illustrate the invention comprises a fixed blade 10 disposed adjacent the rear edge of a flat work supporting bed 11 and a cooperating movable blade 12 mounted on a suitable carrier 13 guided for reciprocation in a path substantially perpendicular to the plane of the bed 11. In the particular machine illustrated, the bed 11 is disposed horizontally and is formed by the web portion of a generally channel shaped member 14 having a depending front flange or apron 15 and a depending vertically disposed rear flange 16. The bed member is bolted or otherwise secured at each end to suitable frame members 17 which provide the necessary support for the various elements of the shears.

The fixed shear blade 10 comprises an elongated bar of steel or other suitable material having its upper edge portion 20 and rear face 21 accurately ground to provide a straight cutting edge. The blade is rigidly secured to the rear flange 16 of the bed member in vertical edgewise position as by bolts or machine screws 22 so that the edge portion 20 is substantially flush with the bed 11. In order to reestablish this flush relaitonship after the blade has been sharpened by grinding off the edge portion as is sometimes necessary, means is provided for adjusting the position of the blade vertically with repect to the bed. To this end the blade is formed with transverse slots 23 for the reception of the screws 22 and a series of adjusting screws 24 threaded into lugs 25 rigid with the flange 16 are arranged to coact with the lower edge of the blade as shown in Fig. 1. Lock nuts 26 serve to hold the adjusting screws in set position.

The movable shear blade 12 is generally similar in form and construction to the fixed shear blade. The lower edge portion 30 and the front face 31 are accurately ground to provide a straight cutting edge adapted to cooperate with the cutting edge of the fixed blade. Support for the blade 12 is provided by the reciprocable carrier 13 which, as herein shown, comprises a rigid horizontal cutter bar 32 fitted with bearing members 33 at each end for coaction with guideways on the frame of the shears. The bearing members are formed to present elongated generally V-shaped projections 35 adapted to slidably engage vertically disposed ways or grooves 36 in a stationary part of the framework to be described presently. The shear blade 12 is mounted in vertical edgewise position on the inner lower edge of the cutter bar which is preferably notched for the reception of the blade. The blade may be attached to the cutter bar in any suitable manner adapted to permit convenient removal for sharpening or replacement.

Reciprocation of the carrier 13 may be effected by any suitable means. In the exemplary machine, the means provided for this purpose comprises eccentrically disposed crank pins 37 carried by a shaft 38 and operatively connected with the bearing members 33 of the carrier by pitmans 39. The shaft may be motor driven or operated by foot power as desired.

In order to properly perform the shearing operation, the carrier must be positioned and guided in its movement so that the front face 31 of the blade 12 passes closely adjacent to or in sliding contact with the rear face 21 of the fixed blade. To maintain this relationship, adjustment of one blade relative to the other in the plane of the work is necessary whenever the thickness of either blade is reduced, as when the face portion is ground off in sharpening the blade. A corresponding adjustment is required when either blade is replaced with a blade of different thickness.

The novel carrier guiding means constituting the present invention provides a convenient means for quickly and accurately making such adjustments in addition to performing its function of guiding the carrier and movable shear blade in its movements relative to the fixed shear blade. To this end, the V-grooves 36 which form the ways for the carrier bearing members are formed in shiftable guide members preferably in the form of generally rectangular blocks 40 which have their side edges 41 inclined with respect to the grooves. The blocks are slidably confined in channels 42 formed in stationary members 43 bolted or otherwise rigidly secured to brackets 44 upstanding from the framework 17 at opposite ends of the bed 11. The side walls of the channels 42 are inclined with respect to the plane of the bed 11 at an angle such that the grooves 36 of the guide blocks are disposed substantially perpendicular to said plane.

Due to the inclination of the channels, the guide blocks with their grooves and the blade carrier guided thereby may be moved either forwardly or rearwardly with respect to the fixed shear blade by shifting the blocks downwardly or upwardly in their respective channels. Such adjustments can be made in very small increments and therefore with a high degree of accuracy since the lateral displacement of the guide blocks is relatively small as compared with the endwise movements required to produce them. Moreover, the adjustments do not alter the perpendicular relationship between the grooves and the bed so that the movement of the shear blades for proper coaction is insured after adjustment.

To facilitate adjustment, each guide block 40 is confined between adjusting screws 45 threaded into brackets 46 secured to the end member 43 at opposite ends of the channel 42. Lock nuts 47 serve to hold the screws in adjusted position. In addition, the guide blocks may be clamped in any set position by locking screws 48 threading into the end member 43 and engaging one side of the block as shown in Fig. 1.

Means is also provided for adjusting the positions of the guide blocks 40 longitudinally of the blade carrier to take up wear. This means, as shown in Fig. 2, comprises a plurality of adjusting screws 50 threaded into each of the end members 43 at the base of the channel 42 for engagement with the rear face of the guide block disposed in the channel. Accordingly the bearing block may be shifted toward or from the blade carrier by appropriate manipulation of the screws 50. Lock nuts 51 threaded onto the projecting ends of the screws serve to lock the parts in adjusted position.

In assembling the shears, the fixed blade 10 is attached to the channel 16 of the bed member and adjusted so that its upper edge 20 is flush with the bed 11. The blade 12 is attached to the cutter bar 32 and the carrier assembly is then placed in the guides with the projections 35 sliding in the grooves 36. Necessary adjustments of the guide blocks toward or from the carrier are made by means of the screws 50 so that the carrier is allowed to slide freely but is securely held against transverse movement. The brackets 46 are then attached to the end members and the adjusting screws 45 manipulated to slide the guide blocks along the channels 42 until the front face 31 of the movable shear blade is properly positioned with respect to the rear face 21 of the fixed shear blade. The shifting of the guide blocks is conveniently effected by turning the screws 45. When the proper positioning is attained, the guide blocks are locked in place by tightening the lock nuts 47 and the locking screws 48.

When either shear blade becomes dulled or worn it may be removed from the shears for sharpening in the usual manner. After replacement the relative spacing of the blades is adjusted by shifting the guide blocks 40 along the channels 42. Thus if the face of either blade is ground off so as to reduce the thickness of the blade, the bearing blocks are shifted downwardly with resultant transverse shifting of the ways and carrier toward the fixed blade. If either blade is replaced by a blade of greater thickness, adjustment is made in the opposite direction, that is, the guide blocks are shifted upwardly in the channels whereby the carrier and movable shear blade are shifted rearwardly. These adjustments do not disturb the normal path or direction of movement of the carrier in moving the blade 12 into operative relation to the fixed blade.

It will be apparent from the foregoing that the invention provides a guide means of novel and advantageous construction for the movable blade support of a squaring shears. By simple, easily performed operations, the relative positions of the blade may be quickly and accurately adjusted to adapt the shears for use with blades of any desired thickness. Moreover, these adjustments can be made with a minimum of effort to compensate for changes in the thickness due to sharpening of the shear blades. Since the adjustments do not affect the normal path of movement of the movable blade carrier, proper meeting of the shear blades is insured after such adjustment.

The novel form and construction of the carrier guiding means also permits convenient adjustment of the guides to take up wear on the bearings on other coacting parts. All adjustments can be performed with relatively simple tools and the parts may be securely locked so that the adjusted position is maintained during the operation of the machine.

I claim as my invention:

1. In a squaring shears having a flat work supporting bed, a fixed shear blade extending along one side of the bed and rigidly attached thereto and a movable shear blade for coaction with the fixed blade, means for guiding the movable blade and for adjusting its path of movement with respect to the fixed blade, said guiding means comprising, in combination a bearing member at each end of the movable blade, a pair of guide members each having a groove adapted to slidably receive one of said bearing members, said grooves being inclined with respect to the side edges of the members, stationary members at each end of the bed formed with channels adapted to receive said guide members and inclined with respect to the bed so as to hold the members in positions such that the grooves therein are substantially perpendicular to the bed, brackets rigid with said stationary members and positioned to extend over the ends of the channels, and adjusting screws threaded into said brackets and engageable respectively with opposite ends of the guide members, said adjusting screws being operative to move the members to and hold them in selected positions in the channels, the inclination of the channels acting to compensate for changes in the thickness of either blade without altering the normal direction of movement of the movable blade with respect to the fixed blade.

2. In a squaring shears having a flat work supporting bed, a fixed shear blade extending along one side of the bed and rigidly attached thereto and a movable shear blade for coaction with the fixed blade, means for guiding the movable blade and for adjusting its path of movement with respect to the fixed blade, said guiding means comprising, a bearing member at each end of the movable blade, a pair of guide members each having a groove adapted to slidably receive one of said bearing members, said grooves being inclined with respect to the side edges of the members, stationary members at each end of the bed formed with channels adapted to receive said guide members and inclined with respect to the bed so as to hold the members in position such that the grooves therein are substantially perpendicular to the bed, and means for adjusting said guide members along said channels, the inclination of the channels serving to determine the relative positions of the shear blades in the plane of the bed without changing the direction of movement of the movable blade.

3. The combination in a squaring shear having a supporting frame, a flat bed carried by the frame, a fixed shear blade mounted at one side of the bed, a second shear blade adapted to coact with the fixed blade in performing a shearing operation and a reciprocable support for the second blade of means for guiding the support for reciprocation in a path substantially perpendicular to the bed whereby the second blade is movable into operative relation to the fixed blade, said guiding means including bearing members on the support, stationary guide members on the frame having guideways formed therein for engagement by said bearing members, and means operable to shift said guide members transversely of the reciprocatory path of the support to adjust the relative positions of the blades for proper shearing action.

4. Guide means for the movable blade support of a squaring shears comprising, in combination, bearing members at opposite ends of the support, guide members providing ways adapted to coact with said bearing members to guide the support in its operative movements, stationary members channeled to receive said guide members, and adjusting screws carried by said stationary members at opposite ends of the channels operative to coact with the guide members for determining the position of the latter in the channels, said channels being inclined at an angle to the ways provided by the guide members so as to effect adjustment of the guide members and the support transversely of the path of operative movement of the support incident to the shifting of the guide members along the channels.

5. Guide means for the movable blade support of a squaring shears comprising, in combination, spaced bearing members rigid with the support, generally rectangular guide members having grooves adapted to slidably receive said bearing members for guiding the support in its movements, stationary members formed with channels dimensioned to slidably receive said guide members, means operable to shift said guide members to selected positions in the channels, the walls of said channels and the cooperating sides of said guide members being inclined with respect to said grooves whereby the positioning of the guide members in the channel is effective to select the plane in which the support is adapted to move, and means for holding the guide members in adjusted position.

6. Guide means for the movable blade support of a squaring shears comprising, in combination, bearing members at opposite ends of the support, guide members providing ways adapted to coact with said bearing members to guide the support in its operative movements, stationary members channeled to receive said guide members, the channels in said members being inclined at an angle to the ways provided by the guide members whereby shifting of the guide members along said channels is effective to adjust the position of the support transversely of its path of operative movement, and means for holding said guide members in adjusted position.

7. Guide means for a movable shear blade support having an elongated rigid bearing member at one end, said guide means including, a generally rectangular guide member grooved in one face to slidably receive the bearing member, means supporting said guide member for adjustment transversely of the path of movement of the support comprising a stationary member having a channel dimensioned to receive the guide member, said channel being inclined with respect to the groove in the guide member whereby the plane in which the shear blade moves may be regulated by shifting the guide member along the channel, and means operable to shift said guide member to any selected position in the channel.

8. In a squaring shears having a work supporting bed, a fixed shear blade extending along one side of the bed and rigidly attached thereto and a movable shear blade adapted to coact with the fixed blade, means for guiding the movable blade including bearing members at each end of the blade, a pair of guide members each having a groove adapted to slidably receive one of said bearing members, stationary members at each end of the bed formed with channels adapted to receive said guide members, adjusting means operative to shift said guide members toward said bearing members to take up wear, and means for holding the guide members in adjusted position.

9. Guide means for a reciprocatory shear blade support having a rigid bearing member at one end, said guide means including, a generally rectangular guide member grooved in one face to slidably receive the bearing member, means supporting said guide member for adjustment transversely of the path of movement of the support comprising a stationary member having a channel dimensioned to receive the guide member, said channel being inclined with respect to the groove in the guide member whereby the reciprocatory path of the support may be shifted by moving the guide member along the channel, means operable to shift said guide member to any selected position lengthwise of said channel, other means operative to shift said guide member outwardly of the channel to take up wear on the coacting parts, and locking means for holding said guide member in adjusted positions.

JOHN JENSEN.